(12) United States Patent
Bernard et al.

(10) Patent No.: US 11,855,577 B2
(45) Date of Patent: Dec. 26, 2023

(54) REGULATING MODULE FOR A ROTARY ELECTRIC MACHINE

(71) Applicant: VALEO EQUIPEMENTS ELECTRIQUES MOTEUR, Creteil (FR)

(72) Inventors: Francois Xavier Bernard, Creteil (FR); Luc Kobylanski, Creteil (FR); Alice Achache, Creteil (FR)

(73) Assignee: VALEO EQUIPEMENTS ELECTRIQUES MOTEUR, Creteil (FR)

( * ) Notice: Subject to any disclaimer, the term of this patent is extended or adjusted under 35 U.S.C. 154(b) by 0 days.

(21) Appl. No.: 17/651,638

(22) Filed: Feb. 18, 2022

(65) Prior Publication Data

US 2022/0263442 A1   Aug. 18, 2022

(30) Foreign Application Priority Data

Feb. 18, 2021   (FR) ..................................... 21 01567

(51) Int. Cl.
*H02P 9/10* (2006.01)
*B60W 10/08* (2006.01)
*H02P 9/48* (2006.01)

(52) U.S. Cl.
CPC ............. *H02P 9/105* (2013.01); *B60W 10/08* (2013.01); *H02P 9/48* (2013.01)

(58) Field of Classification Search
CPC ............ H02P 9/105; H02P 9/48; B60W 10/08
See application file for complete search history.

(56) References Cited

U.S. PATENT DOCUMENTS

| | | | |
|---|---|---|---|
| 2004/0119292 A1* | 6/2004 | Datta | F03D 7/048 |
| | | | 290/44 |
| 2007/0108771 A1* | 5/2007 | Jones | H02P 9/102 |
| | | | 290/44 |

FOREIGN PATENT DOCUMENTS

FR         3 083 025 A1    12/2019

OTHER PUBLICATIONS

French Preliminary Search Report dated Oct. 20, 2021 in French Application 21 01567 filed on Feb. 18, 2021, 10 pages (with English Translation of Categories of Cited Documents & Written Opinion).

* cited by examiner

*Primary Examiner* — Sean Gugger
(74) *Attorney, Agent, or Firm* — Oblon, McClelland, Maier & Neustadt, L.L.P.

(57) ABSTRACT

A regulating module for a rotary electric machine having an operating mode in which a battery of the vehicle is disconnected. The regulating module includes a rotor module and a stator module. The rotor module is arranged to generate a first intermediate setpoint (I_RotRef) on the basis of which is generated the first output quantity (V_Rot) for controlling the rotor, said first intermediate setpoint being determined on the basis of a power potential reference signal (Pdc_MaxRef) and of a speed of rotation (W) of the rotor and being independent of a power or of a control torque of the machine. The stator module is arranged to generate a second intermediate setpoint on the basis of which is generated the second output quantity for controlling the stator, said second intermediate setpoint being determined on the basis of the output voltage of the machine.

20 Claims, 2 Drawing Sheets

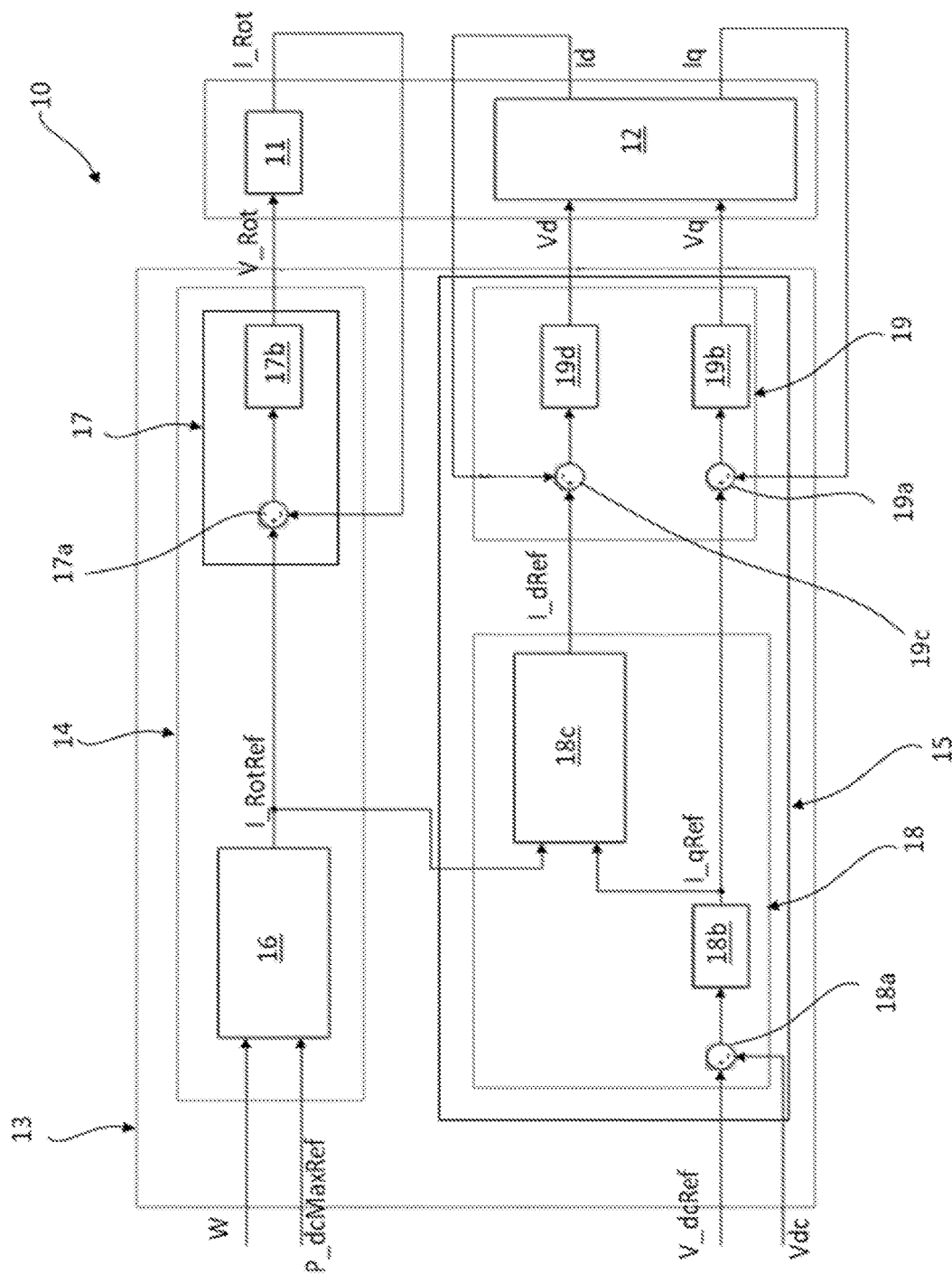
[Fig. 1]

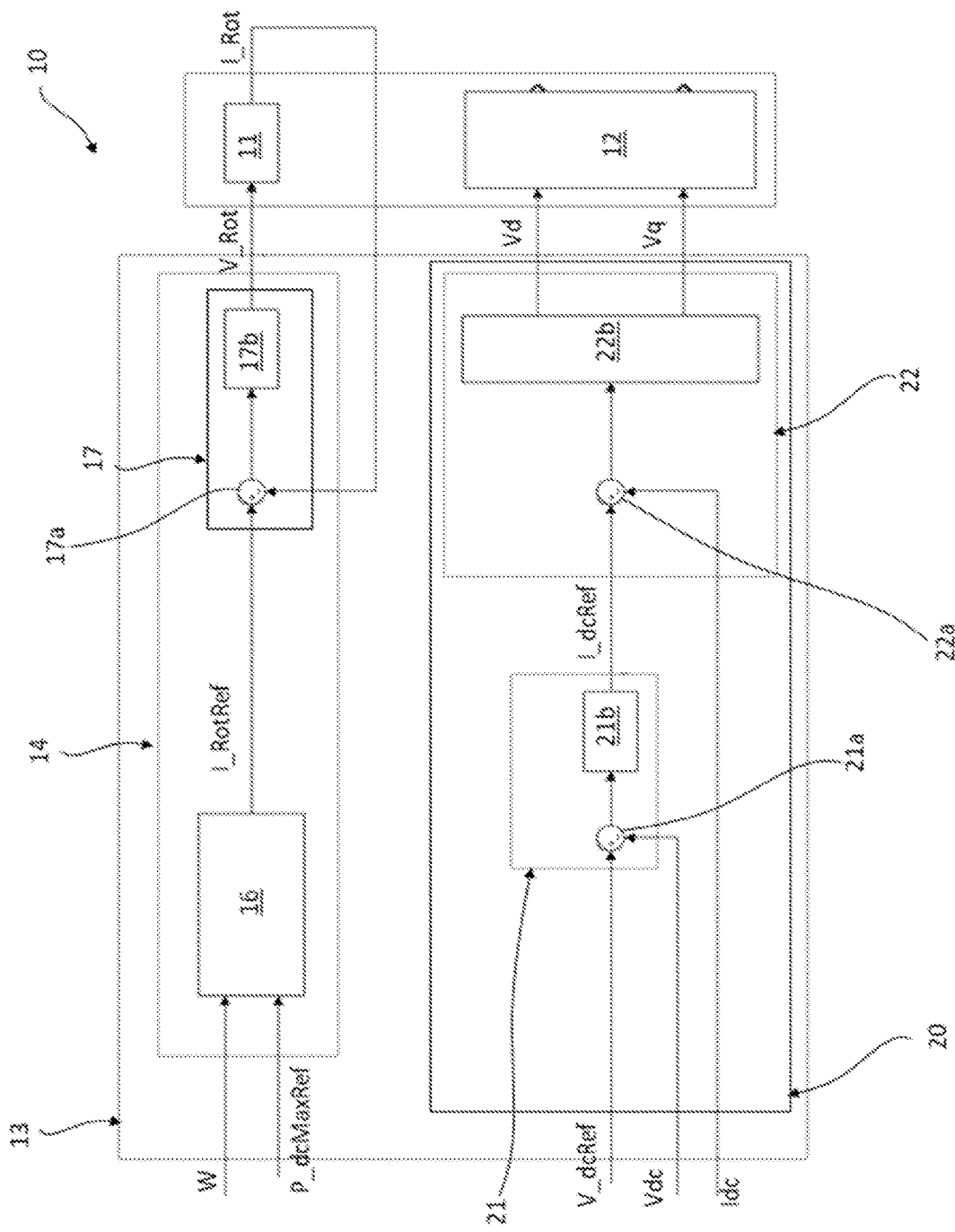
[Fig. 2]

REGULATING MODULE FOR A ROTARY ELECTRIC MACHINE

The invention in particular relates to a regulating module for a rotary electric machine of a vehicle, and in particular to an operating mode in which a battery of the vehicle is disconnected from the machine.

The invention is particularly advantageously applicable in the field of rotary electric machines such as alternators, starter-alternators, or even reversible machines or electric motors. It will be recalled that a reversible machine is a rotary electric machine that is able to operate reversibly, both as an electric generator when functioning as an alternator and as an electric motor for example for starting the combustion engine of the vehicle, such as a motor vehicle.

A rotary electric machine comprises a rotor free to rotate about an axis, and a fixed stator. In alternator mode, when the rotor is rotating, it induces a magnetic field at the stator, which converts it into electric current in order to supply power to the electrical consumers of the vehicle and to recharge the battery. In motor mode, the stator is electrically powered and induces a magnetic field causing the rotor to rotate, for example, in order to start the combustion engine.

Conventionally, the machine comprises a regulating module allowing quantities for controlling the rotor and stator to be generated with a view to controlling the power and/or torque delivered by the machine. Each of these control quantities is determined on the one hand depending on reference parameters, which are in particular provided by the main computer of the vehicle, and which indicate the desired operating level of the machine, and on the other hand depending on instantaneous operating parameters of the machine. The instantaneous parameters are generally the speed of rotation of the rotor and the output voltage and/or current generated by the machine.

Thus, the regulating module comprises a converting module that allows intermediate setpoints for controlling the stator and rotor to be determined on the basis of these reference parameters and of these instantaneous parameters. The intermediate setpoints are then transmitted to regulating modules of the rotor and stator, which generate the final quantities for controlling the rotor and stator. The converting and regulating modules each operate at their own frequency. Thus, time delays are generated between the modules, this possibly leading to an offset between the time at which an instantaneous parameter is measured with a view to computing the intermediate setpoint and the time at which the final control quantity is injected into the rotor and/or stator. The value of the instantaneous parameter may no longer correspond to the operating state of the rotor and/or stator.

Under certain conditions, and in order not to wear out or damage the battery of the vehicle, it is possible to disconnect the rotary electric machine and the battery. For example, when loads of the vehicle must be supplied with power, and outside temperatures are extremely low and vehicle safety conditions are met, it is possible for the computer of the vehicle to request disconnection of the rotary electric machine and battery for a given period, in order to preserve the battery. The rotary electric machine then operates in an operating mode that is referred to as batteryless.

Conventionally, the rotary electric machine is regulated in the same way irrespectively of whether the machine is in a normal operating state or in a batteryless operating state. Thus, the regulating module of the machine is not impacted by the change of mode, excluding modification of certain coefficients allowing quantities for controlling currents and voltages to be optimized.

However, in the batteryless operating mode, time delays due to differences in the operating frequencies of the modules may cause under-voltage or over-voltage faults in the on-board power delivery network of the vehicle, in particular in the case of a minor load draw or of minor load shedding and when there is a low number of loads to be supplied with power. The above-described way in which the rotary electric machine operates in the batteryless operating mode is not robust enough.

The present invention aims to allow the drawbacks of the prior art to be avoided.

To this end, one subject of the present invention is a regulating module for a rotary electric machine of a vehicle, the rotary electric machine comprising a rotor and a stator. According to the invention, the regulating module has an operating mode in which said machine is intended to be disconnected from a battery of the vehicle. Still according to the invention, the regulating module comprises a rotor module arranged to emit a first output quantity for controlling the rotor and a stator module arranged to emit at least one second output quantity for controlling the stator. According to the invention, in particular when the machine is disconnected from a battery of the vehicle, the rotor module is arranged to generate a first intermediate setpoint on the basis of which is generated the first output quantity, said first intermediate setpoint being determined on the basis of a potential power reference signal and of a speed of rotation of the rotor and being independent of a control power or of a control torque of the machine. According to the invention, in particular when the machine is disconnected from a battery of the vehicle, the stator module is arranged to generate a second intermediate setpoint on the basis of which is generated the second output quantity, said second intermediate setpoint being determined on the basis of the output voltage of the machine.

By "said first intermediate setpoint being independent of a control power or of a control torque of the machine" what is meant is the fact that the control power or torque of the machine is not taken into account when determining the first intermediate setpoint of the rotor. The setpoint for controlling the rotor then depends solely on reference parameters and no longer on instantaneous parameters or on the load of the on-board power delivery network. This makes it possible to choose the energization current of the rotor so that the flux emitted by the rotor is sufficient for the machine to be able to pass the current required to supply power to the on-board power delivery network without taking into account an optimization of the efficiency of the rotor. The energization current thus on the whole remains constant for a given speed.

The power potential of the machine is in particular the maximum power that the machine is able to generate for a given speed while meeting steady-state, and in particular thermal, constraints of the machine. This maximum power when the machine is disconnected from the battery may be the maximum power that is able to be transmitted to the on-board power delivery network of the vehicle, where appropriate via a DC/DC converter. This maximum power is for example of the order of a few kW, and for example equal to 2 kW.

The fact that the second intermediate setpoint of the stator depends directly on the output voltage of the machine allows the machine to be regulated with a stator current setpoint rather than with an intermediate torque setpoint as is conventionally the case in a normal operating mode with the battery connected.

The present invention allows variations in load to be better accommodated and pulling out of synchronization to be avoided under a wider range of variations. The output voltage of the machine is thus better regulated. This therefore allows the batteryless operating mode of the rotary electric machine to be made more robust.

According to one embodiment, the first intermediate setpoint may, furthermore, be independent of an output voltage of the machine and/or independent of the torque generated by the machine.

According to one embodiment, the stator module comprises an optimizing sub-module that generates the second intermediate setpoint and a regulating sub-module that generates the second output quantity, the optimizing sub-module and the regulating sub-module in particular having the same operating frequency. This allows the reactivity of the machine with respect to flow variations to which it may be subject to be improved.

According to one embodiment, the second intermediate setpoint is, furthermore, determined on the basis of a reference voltage.

According to one embodiment, the stator module is arranged to emit a second output quantity for controlling the stator and a third output quantity the controlling the stator. For example, the second output quantity allows a stator torque component to be controlled and the third output quantity allows a stator flux component to be controlled.

According to one embodiment, the second output quantity and the third output quantity are determined on the basis of the second intermediate setpoint.

According to one embodiment, the second output quantity is determined on the basis of a comparison between the second intermediate setpoint and a quadrature-axis current of the stator.

According to one embodiment, the third output quantity is determined on the basis of a comparison between a third intermediate setpoint and a direct-axis current of the stator.

According to one embodiment, the third intermediate setpoint is determined on the basis of the first intermediate setpoint and of the second intermediate setpoint.

According to one embodiment, the second output quantity is determined on the basis of a comparison between the second intermediate setpoint and an output current of the machine.

According to one embodiment, the regulating module further comprises a current-measuring device that allows the output current to be measured or a current-estimating device that allows the output current to be estimated.

According to one embodiment, the third output quantity is determined on the basis of a comparison between the third intermediate setpoint and an output current of the machine.

According to one embodiment, the rotor module comprises an optimizing sub-module arranged to generate the first intermediate setpoint and a regulating sub-module arranged to generate the first output quantity, the first output quantity being determined on the basis of a comparison between the first intermediate setpoint and the energization current of the rotor.

According to one embodiment, the rotor module has an operating frequency lower than the operating frequency of the stator module. This makes it possible not to complexify operation of the rotor module without however generating time delays in the computation of the output control setpoints since the regulation of the machine is here more particularly based on the stator module.

According to one embodiment, the regulating module further comprises a current-measuring device that allows the energization current of the rotor to be measured or a current-estimating device that allows the energization current of the rotor to be estimated.

Another subject of the present invention is a rotary electric machine. The rotary electric machine may, advantageously, form an alternator, a starter-alternator, a reversible machine or an electric motor.

Another subject of the present invention may also be a regulating method for a rotary electric machine of a vehicle, the rotary electric machine comprising a rotor and a stator. According to the invention, the regulating method has an operating mode in which said machine is intended to be disconnected from a battery of the vehicle. Still according to the invention, the regulating method is implemented by a regulating module comprising a rotor module arranged to emit a first output quantity for controlling the rotor and a stator module arranged to emit at least one second output quantity for controlling the stator. According to the invention, the regulating method comprises a step of generating a first intermediate setpoint on the basis of which is generated the first output quantity, said first intermediate setpoint being determined on the basis of a power potential reference signal and of a speed of rotation of the rotor and being independent of a control power or of a control torque of the machine. According to the invention, the regulating method comprises a step of generating a second intermediate setpoint on the basis of which is generated the first output quantity, said second intermediate quantity being determined on the basis of the output voltage of the machine.

The present invention will possibly be better understood on reading the following detailed description of non-limiting examples of implementation of the invention, and on studying the appended drawings.

FIG. 1 shows, partially, a block diagram of a first example of a regulating module according to the invention.

FIG. 2 shows, partially, a block diagram of a second example of a regulating module according to the invention.

Identical, similar or analogous elements have been designated by the same references in both figures. In addition, the examples of embodiments that are described below are in no way limiting. In particular, variants of the invention that comprise only a selection of the features described below, separately from the other described features, may be envisaged.

A rotary electric machine 10, in particular for a vehicle such as a motor vehicle or a drone, converts mechanical energy into electrical energy, in alternator mode, and may operate in motor mode to convert electrical energy into mechanical energy. This rotary electric machine 10 is, for example, an alternator, a starter-alternator, a reversible machine or an electric motor. The machine 10 may comprise a rotor 11, a stator 12 and an electronic assembly such as an inverter or a voltage converter. The casing may house the rotor 11 and the stator 12. The electronic assembly may be mounted on the casing or be located away from the casing.

The rotor 11 is a claw-pole rotor comprising, here, two claw poles and one coil wound around a core of the claw poles. For example, the machine comprises a commutator that is mounted on the rotor and that comprises commutator rings that are connected by wired links to the coil and a brush holder placed so that brushes rub against the commutator rings so as to allow electrical power to be supplied to the coil of the rotor. The brushes of the brush holder are electrically connected to a control module of the electronic assembly that allows the supply of electrical power to the rotor to be controlled.

The stator 12 comprises a body, which is for example formed from a stack of notched laminations, and an electrical winding mounted in the body. The electrical winding is formed from one or more phases comprising at least one electrical conductor. Each phase comprises an end forming a phase output that is electrically connected to a power module of the electronic assembly in order to allow the stator to be controlled and the current output from the machine to be rectified.

The electronic assembly comprises a power stage, comprising at least one power module allowing an electrical power signal to be received from or delivered to the electrical phases of the winding. The power module forms a bridge voltage rectifier for converting the AC voltage generated by the phases of the stator into a DC voltage and/or, conversely, for converting a DC voltage into an AC voltage to be fed to the phases of the stator. The electronic assembly also comprises a control stage comprising a control module that allows, in particular, the voltage of the rotor 11 and the voltage of the stator 12 to be controlled, and that forms an interface with an external computer of the vehicle assigned overall control of the machine.

The control module of the electronic assembly comprises a regulating module 13 that allows the voltages and/or currents supplied to the rotor and stator to be controlled and regulated, in particular in an operating mode of the machine that is said to be batteryless. In this batteryless operating mode, the machine 10 is not electrically connected to a battery of the vehicle. The battery is disconnected from the machine by a switch for example. In the case where the vehicle comprises a plurality of batteries, in particular a battery for the 12 V power delivery network and a battery for the 48 V power delivery network, the machine is disconnected from one of the batteries of the vehicle, in particular the 48 V power delivery network.

In the first example of embodiment illustrated in FIG. 1, the regulating module 13 comprises a rotor module 14 and a stator module 15. The rotor module comprises, here and non-limitingly, an optimizing sub-module 16 and a regulating sub-module 17. Similarly, the stator module comprises, here and non-limitingly, an optimizing sub-module 18 and a regulating sub-module 19.

The optimizing sub-module 16 of the rotor module 14 receives, by way of input data, a speed W and a machine power potential reference signal P_dcMaxRef. The power potential P_dcMaxRef of the machine is in particular the maximum power that the machine is able to generate for a given speed while meeting steady-state, and in particular thermal, constraints of the machine. The optimizing sub-module 16 generates a first intermediate setpoint I_RotRef on the basis of the speed W and of the machine power potential reference signal P_dcMaxRef. The output parameters of the machine, i.e. parameters such as an output voltage Vdc, are not taken into account in the computation of the first intermediate setpoint I_RotRef. The first intermediate setpoint I_RotRef is for example computed on the basis of a map giving an energization current as a function of the speed W.

The speed W corresponds to the actual speed of rotation of the rotor 11. The speed W may be estimated or measured using a rotation sensor for example.

The regulating sub-module 17 of the rotor module 14 receives, by way of input data, the first intermediate setpoint I_RotRef, which is emitted by the optimizing sub-module 16, and an energization current I_Rot of the rotor 11. The regulating sub-module 17 comprises a comparator 17a that allows the two input data to be compared with a view to determining a first error. The regulating sub-module 17 also comprises, here, a corrector 17b that allows the first error to be converted into a first output quantity V_Rot for controlling the energization current of the coil of the rotor 11.

The energization current I_Rot corresponds to the actual energization current of the rotor 11. The energization current I_Rot may be estimated or measured using a current sensor for example.

For example, the optimizing sub-module 16 and the regulating sub-module 17 of the rotor module 14 operate at the same frequency, which is for example 1 kHz. For example, the rotor module 14 may use a pulse-width-modulated regulating signal (PWM).

The rotor module 14 may comprise a module (not shown) for providing thermal protection, which allows heating of the rotor 11 to be prevented.

The optimizing sub-module 18 of the stator module 15 receives, by way of input data, the output voltage Vdc of the machine and a reference voltage V_dcRef. The output voltage Vdc of the machine corresponds to the actual voltage across the output of the machine 10 and in particular to the output of the electronic assembly after rectification via the power modules. The output voltage Vdc may be measured. The reference voltage V_dcRef corresponds to a setpoint voltage, which is for example given by the computer of the vehicle, that it is desired for the machine to output.

The optimizing sub-module 18 comprises, here, a comparator 18a that allows the two input data to be compared with a view to determining an intermediate error. The optimizing sub-module 18 also comprises, here, a corrector 18b that allows the intermediate error to be converted into a second intermediate setpoint I_qRef.

In this example, the optimizing sub-module comprises a determining module 18c that receives, by way of input data, the second intermediate setpoint I_qRef and the first intermediate setpoint I_RotRef emitted by the optimizing sub-module 16. The determining sub-module 18c generates a third intermediate setpoint I_dRef.

The optimizing sub-module 18 emits, here, two different immediate setpoints.

The regulating sub-module 19 of the stator module 15 receives, by way of input data, the second intermediate setpoint I_qRef, the third intermediate setpoint I_dRef, which is emitted by the optimizing sub-module 18, and a direct-axis current Id and a quadrature-axis current Iq of the stator 12.

The regulating sub-module 19 comprises a first comparator 19a that allows the second intermediate setpoint I_qRef to be compared with the quadrature-axis current Iq with a view to determining a second error. The regulating sub-module 19 also comprises, here, a first corrector 19b that allows the second error to be converted into a second output quantity Vq for controlling the voltage injected into the winding of the stator 12.

The regulating sub-module 19 may also comprise a second comparator 19c that allows the third intermediate setpoint I_dRef to be compared with the direct-axis current Id with a view to determining a third error. The regulating sub-module 19 may also comprise a second corrector 19d that allows the third error to be converted into a third output quantity Vd for controlling the voltage injected into the winding of the stator 12.

For example, the second output quantity Vq allows a torque component of the stator 12 to be controlled and the third output quantity Vd allows a flux component of the stator 12 to be controlled.

The direct-axis current Id and the quadrature-axis current Iq correspond, respectively, to components, in a Park vector reference frame, of the actual phase current of the stator 12. Said currents Id, Iq may be estimated and/or measured using a current sensor for example.

For example, the optimizing sub-module 18 and the regulating sub-module 19 of the stator module 15 operate at the same frequency, which is for example 10 kHz. The operating frequency of the stator module 15 is here higher than the operating frequency of the rotor module 14. For example, the stator module 15 may use a pulse-width-modulated regulating signal (PWM) or a full-wave-modulated regulating signal.

In the example of FIG. 2, which illustrates a second embodiment, the rotor module 14 is identical to that of the first embodiment described with reference to the example of FIG. 1. Only the stator module 15 is different and will be described below.

The stator module 20 comprises, here, an optimizing sub-module 21 and a regulating sub-module 22.

The optimizing sub-module 21 receives, by way of input data, the output voltage Vdc of the machine and the reference voltage V_dcRef. The output voltage Vdc and the reference voltage V_dcRef are identical to those of the first embodiment. The optimizing sub-module 21 comprises, here, a comparator 21*a* that allows the two input data to be compared with a view to determining a first error. The optimizing sub-module 21 also comprises, here, a corrector 21*b* that allows the first error to be converted into a second intermediate setpoint I_dcRef.

The regulating sub-module 22 receives, by way of input data, the second intermediate setpoint I_dcRef, which is emitted by the optimizing sub-module 21, and an output current Idc of the stator 12. The regulating sub-module 22 comprises a comparator 22*a* that allows the two input data to be compared with a view to determining a second error. The regulating sub-module 22 also comprises, here, a corrector 22*b* that allows the second error to be converted into the second output quantity Vq and the third output quantity Vd. The second output quantity Vq and the third output quantity Vd are respectively identical to those of the first embodiment.

The output current Idc corresponds to the actual output current of the machine 10 and in particular to the output of the electronic assembly after rectification via the power modules. The output current Idc may be estimated or measured using a current sensor for example.

For example, the optimizing sub-module 21 and the regulating sub-module 22 of the stator module 15 operate at the same frequency, which is for example 10 kHz. For example, the stator module 15 may use a pulse-width-modulated regulating signal (PWM) or a full-wave-modulated regulating signal.

The present invention is applicable in particular to the field of alternator or reversible-machine regulating systems, but it could equally well be applied to any type of rotary machine.

Of course, the above description has been provided merely by way of example only and does not limit the field of the present invention, which field will not be departed from if the various elements are replaced with any other equivalent elements.

The invention claimed is:

1. A regulating module for a rotary electric machine connected to a battery of a vehicle, the rotary electric machine comprising a rotor and a stator and the regulating module having an operating mode in which said rotary electric machine is disconnected from the battery of the vehicle, the regulating module comprising a rotor module arranged to emit a first output quantity (V_Rot) for controlling the rotor and a stator module arranged to emit at least one second output quantity for controlling the stator, wherein:

the rotor module is arranged to generate a first intermediate setpoint (I_RotRef) on the basis of which is generated the first output quantity (V_Rot), said first intermediate setpoint (I_RotRef) being determined on the basis of a power potential reference signal (Pdc_MaxRef) and of a speed of rotation (W) of the rotor and being independent of a control power or of a control torque of the rotary electric machine, the power potential reference signal being a maximum power able to be generated while meeting steady-state constraints, and the stator module is arranged to generate a second intermediate setpoint on the basis of which is generated the at least one second output quantity, said second intermediate setpoint being determined on the basis of an output voltage (Vdc) of the rotary electric machine.

2. The regulating module according to claim 1, wherein the stator module comprises an optimizing sub-module that generates the second intermediate setpoint and a regulating sub-module that generates the at least one second output quantity, the optimizing sub-module and the regulating sub-module having the same operating frequency.

3. The regulating module according to claim 1, wherein the second intermediate setpoint is, furthermore, determined on the basis of a reference output voltage (V_dcRef).

4. The regulating module according to claim 1, wherein the stator module is arranged to emit a second output quantity (Vq) for controlling the stator and a third output quantity (Vd) for controlling the stator as the at least one second output quantity.

5. The regulating module according to claim 4, wherein the second output quantity (Vq) and the third output quantity (Vd) are determined on the basis of the second intermediate setpoint.

6. The regulating module according to claim 4, wherein the second output quantity (Vq) is determined on the basis of a comparison between the second intermediate setpoint and a quadrature-axis current (I_q) of the stator.

7. The regulating module according to claim 4, wherein the third output quantity (Vd) is determined on the basis of a comparison between a third intermediate setpoint (I_dRef) and a direct-axis current (I_d) of the stator.

8. The regulating module according to claim 7, wherein the third intermediate setpoint (I_dRef) is determined on the basis of the first intermediate setpoint (I_RotRef) and of the second intermediate setpoint.

9. The regulating module according to claim 1, wherein the rotor module comprises an optimizing sub-module arranged to generate the first intermediate setpoint (I_RotRef) and a regulating sub-module arranged to generate the first output quantity (V_Rot), the first output quantity (V_Rot) being determined on the basis of a comparison between the first intermediate setpoint (I_RotRef) and an energization current (I_Rot) of the rotor.

10. The rotary electric machine comprising the regulating module according to claim 1.

11. The regulating module according to claim 2, wherein the second intermediate setpoint is, furthermore, determined on the basis of a reference output voltage (V_dcRef).

12. The regulating module according to claim 2, wherein the stator module is arranged to emit a second output quantity (Vq) for controlling the stator and a third output quantity (Vd) for controlling the stator as the at least one second output quantity.

13. The regulating module according to claim 5, wherein the second output quantity (Vq) is determined on the basis of a comparison between the second intermediate setpoint and a quadrature-axis current (I_q) of the stator.

14. The regulating module according to claim 5, wherein the third output quantity (Vd) is determined on the basis of a comparison between a third intermediate setpoint (I_dRef) and a direct-axis current (I_d) of the stator.

15. The regulating module according to claim 2, wherein the rotor module comprises an optimizing sub-module arranged to generate the first intermediate setpoint (I_RotRef) and a regulating sub-module arranged to generate the first output quantity (V_Rot), the first output quantity (V_Rot) being determined on the basis of a comparison between the first intermediate setpoint (I_RotRef) and an energization current (I_Rot) of the rotor.

16. The rotary electric machine comprising the regulating module according to claim 2.

17. The regulating module according to claim 3, wherein the stator module is arranged to emit a second output quantity (Vq) for controlling the stator and a third output quantity (Vd) for controlling the stator.

18. The regulating module according to claim 6, wherein the third output quantity (Vd) is determined on the basis of a comparison between a third intermediate setpoint (I_dRef) and a direct-axis current (I_d) of the stator.

19. The regulating module according to claim 3, wherein the rotor module comprises an optimizing sub-module arranged to generate the first intermediate setpoint (I_RotRef) and a regulating sub-module arranged to generate the first output quantity (V_Rot), the first output quantity (V_Rot) being determined on the basis of a comparison between the first intermediate setpoint (I_RotRef) and an energization current (I_Rot) of the rotor.

20. The rotary electric machine comprising the regulating module according to claim 3.

* * * * *